United States Patent
Chang et al.

(10) Patent No.: US 7,600,237 B2
(45) Date of Patent: Oct. 6, 2009

(54) LOCKING DEVICE OF LIFT-TOP OPTICAL DISC DRIVE

(75) Inventors: Yuan-Hung Chang, Taipei (TW); Tzu-Nan Chen, Taipei (TW); Hui-Chu Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 912 days.

(21) Appl. No.: 11/108,682

(22) Filed: Apr. 19, 2005

(65) Prior Publication Data

US 2005/0236849 A1 Oct. 27, 2005

(30) Foreign Application Priority Data

Apr. 22, 2004 (TW) .............................. 93206245 U

(51) Int. Cl.
*G11B 33/02* (2006.01)
(52) U.S. Cl. .................................................... 720/657
(58) Field of Classification Search .................. 70/256, 70/278.7, 279.1, 277, 278.6, 280, 281, 282, 70/283; 292/95, 121, 122, 127, 201, 251.1, 292/DIG. 11; 720/657, 655
See application file for complete search history.

(56) References Cited

U.S. PATENT DOCUMENTS

| 5,823,026 A | * | 10/1998 | Finke | 70/276 |
| 6,709,032 B2 | * | 3/2004 | Huang | 292/201 |
| 2003/0174626 A1 | * | 9/2003 | Joung | 369/75.1 |

FOREIGN PATENT DOCUMENTS

GB 2230550 A * 10/1990

* cited by examiner

*Primary Examiner*—Julie Anne Watko
(74) *Attorney, Agent, or Firm*—Bacon & Thomas, PLLC

(57) ABSTRACT

A locking device for locking a main body with a lid is provided. The locking device includes a base, a fixed piece, an engaging piece, and a driver. The base is disposed on the main body. The fixed piece disposed on the base includes a track. The engaging piece slides in the track. The first end of the engaging piece is received into or separated from the recess when the engaging piece slides. The driver drives the engaging piece to slide in the track. In locking state, the engaging piece is engaged with the recess of the lid, while the lid is locked with main body. When the driver drives the engaging piece to slide along track, the first end of the engaging piece is separated from the recess of the lid for the lid to be unlocked from the main body.

13 Claims, 5 Drawing Sheets

LOCKING DEVICE OF LIFT-TOP OPTICAL DISC DRIVE

This application claims the benefit of Taiwan Application Serial No. 093206245 filed Apr. 22, 2004, the subject matter of which is incorporated herein by reference.

BACKGROUND OF THE INVENTION

1. Field of the Invention

The invention relates in general to a locking device, and more particularly to a locking device of an apparatus with a lift-top.

2. Description of the Related Art

Referring to FIG. 1, a side view of a locking device according to a conventional lift-top optical disc drive is shown. Conventional flip-top optical disc drive 10 at least includes a lid 11, a main body and a locking device. The lid 11 has a recess 11a. The locking device is for moveably locking the main body with the lid 11. The locking device includes a base 12, an electro-magnetic switch 13 and a hook 14. The base 12 is disposed on the main body of the optical disc drive. The electro-magnetic switch 13 is disposed on the base 12 for driving the hook 14. The hook 14 is pivotally connected to base 12, wherein the first end 14a of the hook 14 is connected to the electro-magnetic switch 13, while the second end 14b of the hook 14 is disposed corresponding to the recess 11a disposed at the front end of the lid. In locking state, the electro-magnetic switch 13 supports the hook 14 to abut the recess 11a, so that the lid 11 is locked with the main body. When the electro-magnetic switch 13 is power on to pull the first end 14a of the hook 14, the hook 14 swings around a pivot point 14c and the second end 14b of the hook 14 is separated from the recess 11a for the lid 11 to be unlocked from the main body.

However, when the disc inside the optical disc drive explodes due to high speed rotation will apply a vertically upward force to the lid 11. In a conventional design, the vertical direction force received by the lid 11 will be transmitted to the front end of the hook 14 causing the hook 14 to tilt towards an arrow direction A to be detached from the lid 11. It can be seen from the above disclosure that when the disc explodes, the locking device of a conventional lift-top optical disc drive will loose easily and the broken pieces of the disc would even hurt the user.

SUMMARY OF THE INVENTION

It is therefore an object of the invention to provide a locking device preventing the lid from being opened when the disc explodes.

The invention achieves the above-identified object by providing a locking device for locking the main body and the lid of the lift-top device. The locking device includes a base, a fixed piece, an engaging piece, and a driver. The base is disposed on the main body. The fixed piece having a track is disposed on the base. The engaging piece, slideably protruding from the track, has a first end and a second end, wherein the first end, which is disposed corresponding to the recess, is received into or separated from recess when the engaging piece slides along the first direction. The driver is disposed on the base and is connected to the engaging piece for driving the engaging piece to slide in the track along the first direction. In locking state, the engaging piece is engaged with the recess, while the lid is locked with the main body. When the driver drives the engaging piece to slide along the track, the first end of the engaging piece is separated from the recess for the lid to be unlocked from the main body.

It is therefore another object of the invention to provide a lift-top optical disc drive, including a main body, a lid, a base, a fixed piece, a engaging piece and a driver. The lid has a recess pivotally connected to one end of the main body. The base is disposed on another end of the main body. The fixed piece is disposed on the base and has a track. The engaging piece, slideably protruding from track, has a first end and a second end, wherein the first end, which is disposed corresponding to the recess of the lid, is received into or separated from recess when the engaging piece slides reciprocally along the first direction. The driver is disposed on the base and is connected to the engaging piece for driving the engaging piece to slide in the track along the first direction. In locking state, the engaging piece is engaged with the recess of the lid, wherein the lid is locked with the main body. When the driver drives the engaging piece to slide along the track, the first end of the engaging piece is separated from the recess of the lid for the lid to be unlocked from the main body.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
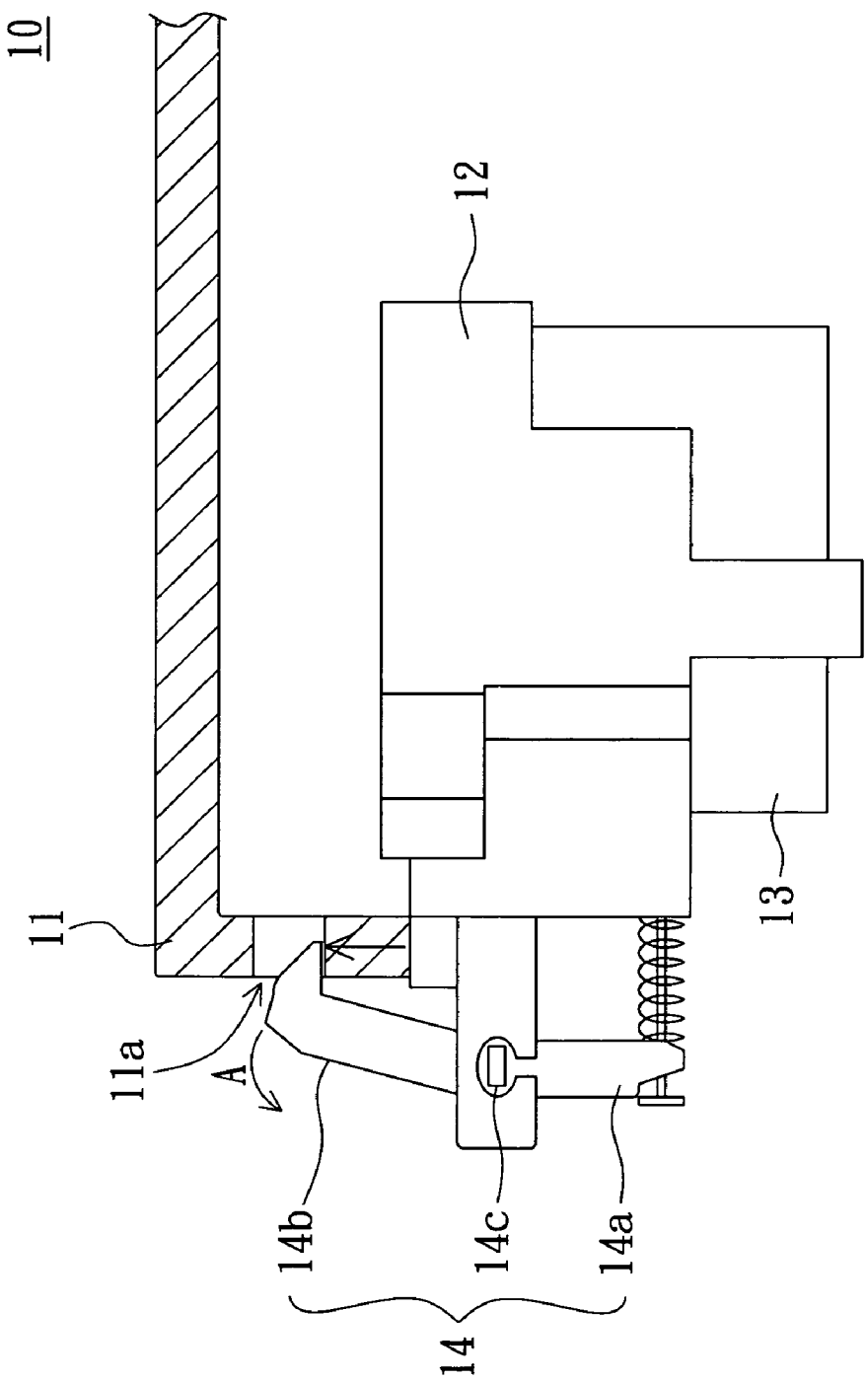
FIG. 1 is a side view of a locking device according to a conventional optical disc drive.
Figure 2:
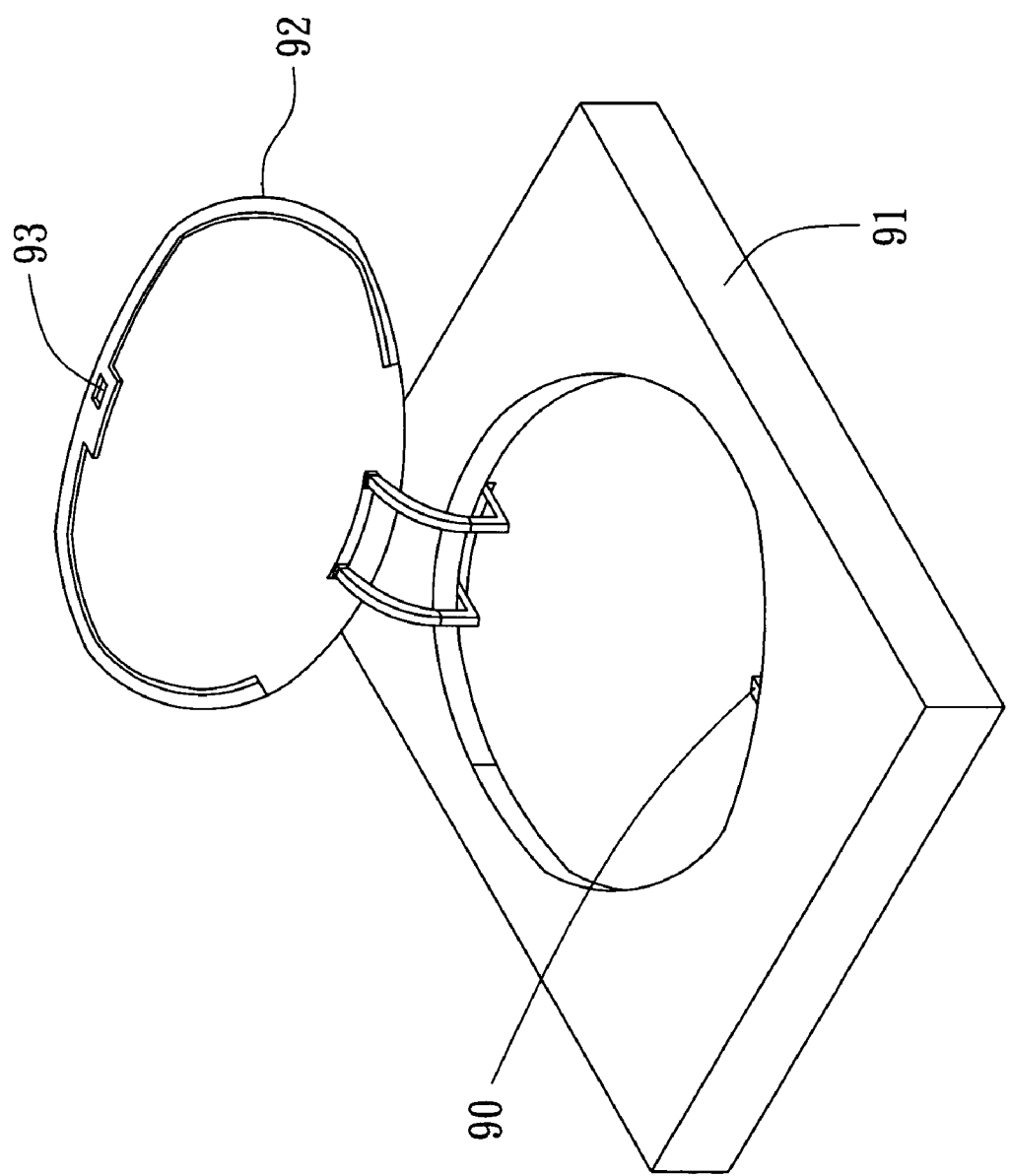
FIG. 2 is a perspective view of a lift-top device according to a preferred embodiment of the invention.

Referring to FIG. 2, a perspective diagram of a lift-top optical disc drive according to a preferred embodiment of the invention is shown. The lift-top device 100 includes a main body 91, a lid 92 and a locking device 90. The lid 92 is pivotally connected to one end of the main body 91. The locking device 90 is for locking the main body 91 with the lid 92. The lift-top device 100, for example, is a lift-top optical disc drive. Preferably, a recess 93 is formed on the lid 92, and the locking device is disposed on the main body 91 corresponding to the recess 93. The invention is not limited. Herein, the recess could be formed on the main body and the locking device is relatively disposed on the lid.

Figure 3:
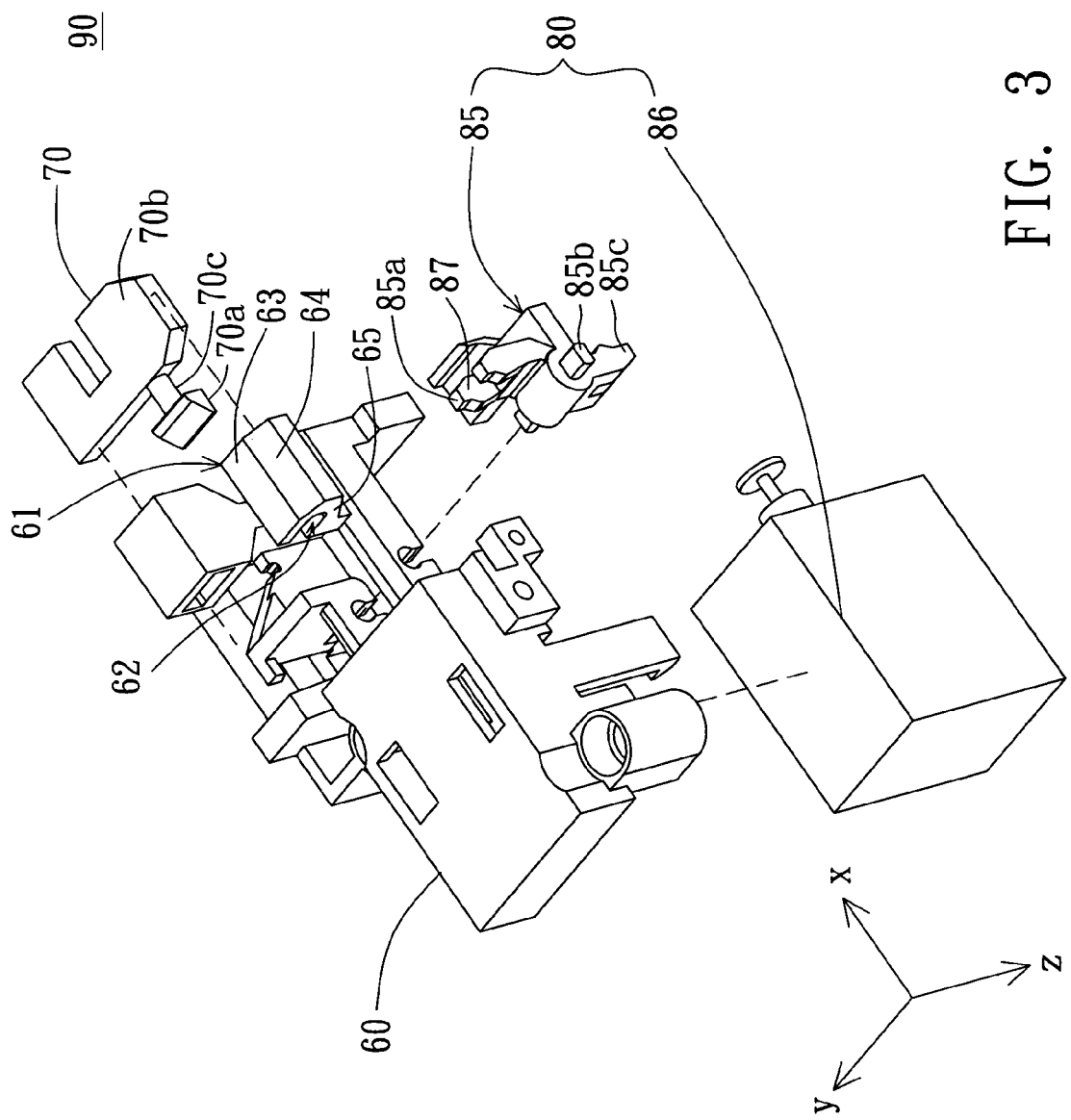
FIG. 3 is a explosive diagram illustrating a locking device of a lift-top device according to a preferred embodiment of the invention.

Referring to FIG. 3, a perspective explosive diagram illustrating a locking device of a lift-top device according to a preferred embodiment of the invention is shown. The locking device 90 includes a base 60, a fixed piece 61, an engaging piece 70, and a driver 80. The base 60 is disposed on the main body. The fixed piece 61 disposed on the base 60 has a track 62. The engaging piece 70 slideably protruding from track has a first end 70a and a second end 70b. The first end 70a of the moveable piece 70 is disposed corresponding to the recess 93 of the lid 92 as shown in FIG. 2. The first end 70a of the moveable piece 70 could be received into or separated from recess 93 when the engaging piece 70 slides back and forth along the first direction (i.e., the x-axis direction). The driver 80 is disposed on the base 60 and is connected to the engaging piece 70 and used for driving the engaging piece 70 to slide in the track 62 along the first direction (i.e., the x-axis direction). In locking state, the engaging piece 70 is engaged with the recess 93 of the lid 92, enabling the lid 92 to be locked with the main body 91. When the driver 80 drives the engaging piece 70 to slide along track 62, the first end 70a of the engaging piece 70 is detached from the recess 93 of the lid 92, so that the lid 92 is separated from the main body 91.

Figure 4A:
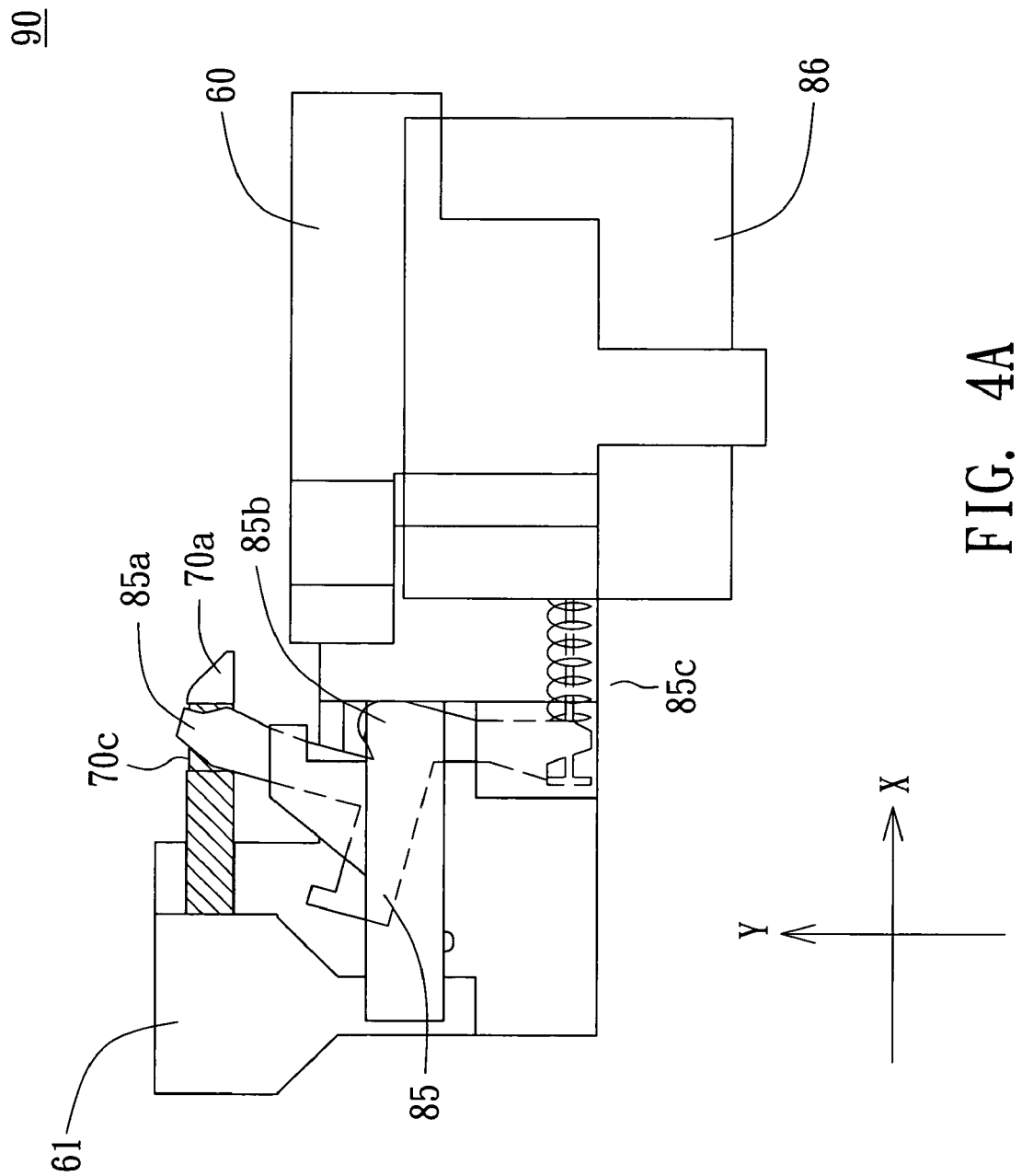
FIG. 4a is a side view of a locking device according to the invention in locking state.
Figure 4B:
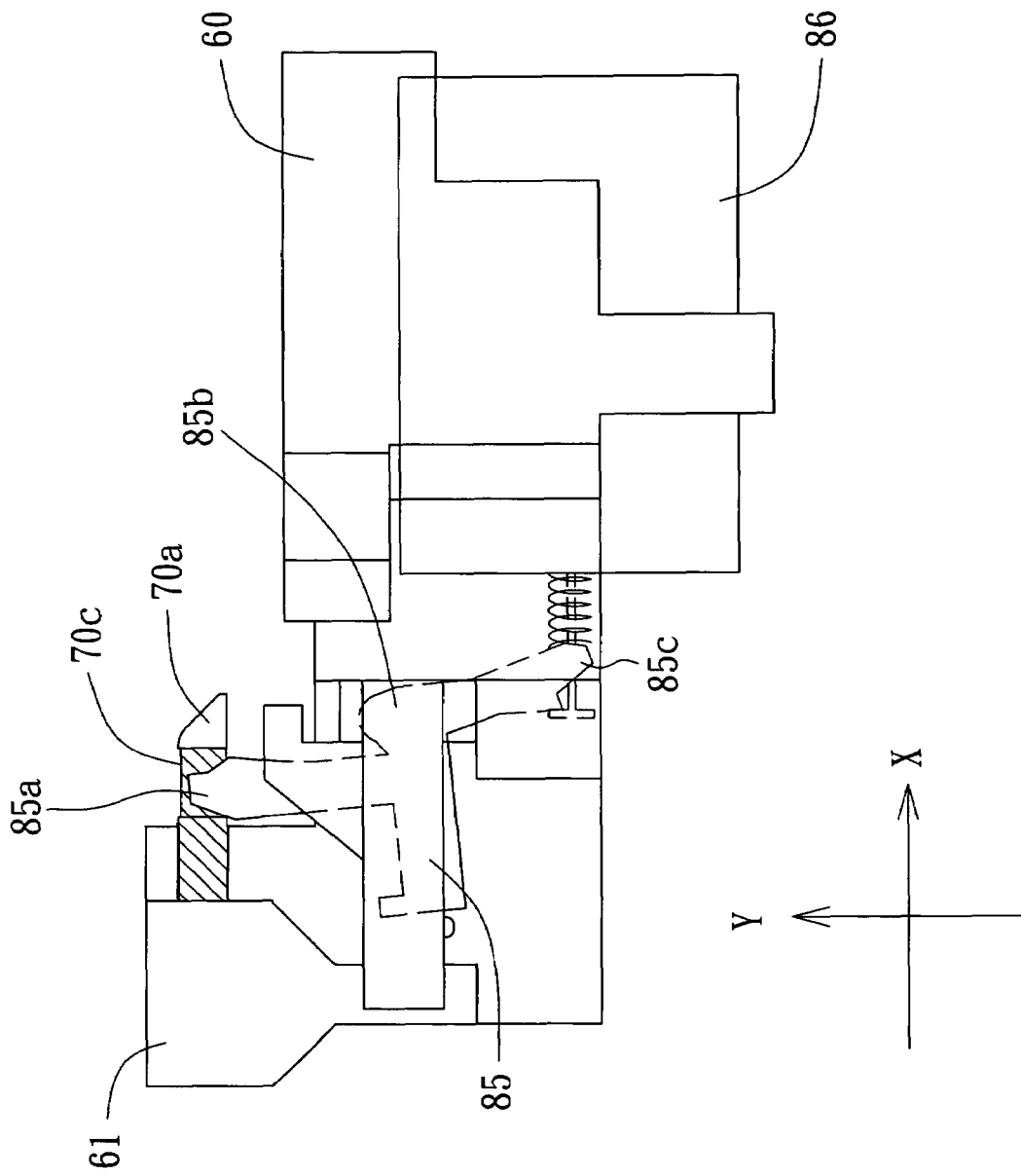
FIG. 4b is a side view of a locking device according to the invention in unlocking state.

As shown in FIG. 3, in locking device 90, the driver 80 includes a moveable piece 85 and an electro-magnetic switch 86. The moveable piece 85 has a third end 85a, a extending portion 85b and a fourth end 85c. The third end 85a of the moveable piece 85 is connected to the engaging piece 70. The extending portion 85b of the moveable piece 85 jointing the third 85a and the fourth end 85c is pivotally connected to base 60. The connection between the extending portion 85b and the base is used as a pivot point. It allows the third end 85a and the fourth 85c of the moveable piece 85 to rotate around. The electro-magnetic switch 86 is disposed on the base 60 and is connected to the fourth end 85c of the moveable piece 85. The electro-magnetic switch 86 is used for driving the fourth end 85c of the moveable piece 85, so that the moveable piece 85 rotates around. Referring to FIG. 4a, a side view of a locking device according to the invention in locking state is shown. In locking state, the third end 85a of the moveable piece 85 supports the engaging piece 70 to be engaged with the recess (not shown in the diagram). Referring to FIG. 4b, a side view of a locking device according to the invention in unlocking state is shown. When the electro-magnetic switch 86 drives the moveable piece 85, the fourth end 85c of the moveable piece 85 swings around the pivot point formed by the extending portion 85b and causes the third end 85a of the moveable piece 85 to swing simultaneously. The third end 85a of the moveable piece 85, which is connected to the engaging piece 70, brings the engaging piece 70 to slide along the first direction (i.e., the x-axis direction in the diagram), so that the engaging piece 70 is displaced and separated from the recess.

In the locking device 90, the third end 85a of the moveable piece 85 further has a slit 87, while the engaging piece 70 further has a connecting part 70c formed between the first end of 70a and the second end 70b. The slit 87 holds the connecting part 70c and brings the engaging piece 70 to slide when the moveable piece 85 rotates around the pivot point.

In the locking device 90, the track 62 and the main body 91 are preferably disposed in parallel, while the engaging piece 70 received in the track 62 is also disposed on the main body 91 in a parallel manner. Such that the track 62 and the engaging piece 70 can be disposed parallel to a virtual rotating plane of the disc.

Beside, in the locking device 90, the fixed piece 61 at least includes a first side plate 63, a second side plate 64 and a third side plate 65 disposed corresponding to the bottom, the side surface and the top surface of the engaging piece 70. The first, second and third side plates 63, 64 and 65 are disposed surrounding the engaging piece 70 to form the track 62. When the engaging piece 70 receives an external force perpendicular to the first direction, the first, second and third side plates 63, 64 and 65 can absorb the external force, so that the engaging piece 70 still could be engaged with the recess 93 without deflection or translation.

On the other hand, anyone skilled in the art can make appropriate modification to the locking device disclosed in the present preferred embodiment. For example, the electromagnetic switch can be connected to the second end of the engaging piece with the moveable piece omitted, and the engaging piece can be driven using the pulling force and the pushing force by the electro-magnetic switch.

The locking device disclosed in the above preferred embodiment greatly enhances the stability and the strength of the lift-top optical disc drive when locked. Firstly, the engaging piece of the locking device according to the invention is surrounded by the track formed by side plates, so that the engaging piece can be shifted only along a horizontal direction. When the optical disc drive receives concussion, explosion or any external forces, the track formed by side plates can absorb various perpendicular external forces, so that the engaging piece can be tightly engaged with the recess to secure the lid on the main body. Next, owing to the leverage principle, the moveable piece enlarges the power of the electro-magnetic switch, so that the engaging length between the recess and the engaging piece will not be restricted by the power of the electro-magnetic switch. Further, by adjusting the pivot point on the moveable piece, the active torque of the electro-magnetic switch can be changed to enhance the locking strength between the engaging piece and the lid.

Apart from the above preferred embodiment, the invention can make appropriate modifications with regards to the disposition of the recess and the locking device. Similar to the above disclosure, the recess can be selectively to be formed on the lid, meanwhile, the base of the lock device is disposed on the main body; or the recess can be selectively to be formed on the main body, meanwhile, the base of the lock device is disposed on the lid.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A locking device for locking a lid with a main body of a lift-top device, the locking device comprising:
    a base;
    a fixed piece disposed on the base, the fixed piece comprising a track;
    a engaging piece slideably protruding from the track, the engaging piece having a first end and a second end, the first end of the engaging piece disposed corresponding to a recess; and
    a driver disposed on the base and connected to the engaging piece for driving the engaging piece to slide in the track along a first direction, wherein the driver comprises;
    a moveable piece having a third end, an extending portion and a fourth end, the extending portion jointing the third and the fourth end and pivotally connected to the base so as to allow the third end and the fourth end of the moveable piece to rotate around the extending portion as a pivot point, the third end of the moveable piece connected to the engaging piece for supporting the engaging piece to be engaged with the recess;
    wherein when the engaging piece is driven to slide along the track by the driver, the first end of the engaging piece is detached from the recess.

2. The locking device according to claim 1, wherein the recess is formed on the lid, while the base is disposed on the main body.

3. The locking device according to claim 2, wherein the track is disposed in the main body in a parallel manner, while the engaging piece received in the track is also disposed on the main body in a parallel manner.

4. The locking device according to claim 1, wherein the recess is formed on the main body, while the base is disposed on the lid.

5. The locking device according to claim 1, wherein the driver further comprises:
   an electro-magnetic switch disposed on the base and connected to the fourth end of the moveable piece for driving the fourth end of the moveable piece to rotate;
   wherein the electro-magnetic switch drives the moveable piece to rotate for allowing the engaging piece to slide along the track.

6. The locking device according to claim 1, wherein the third end of the moveable piece further has a slit, and the engaging piece further has a connecting part formed between the first end and the second end, the slit holding the connecting part, enabling the engaging piece to slide when the moveable piece rotates.

7. The locking device according to claim 1, wherein the fixed piece comprises a first side plate, a second side plate and a third side plate disposed corresponding to the bottom, the side surface and the top surface of the engaging piece, the first, second and third side plates disposed surrounding the engaging piece to form the track.

8. The locking device according to claim 1, wherein the lift-top device is a lift-top optical disc drive.

9. A lift-top optical disc drive, comprising:
   a main body;
   a lid having an recess, wherein the lid is pivotally connected to one end of the main body;
   a base disposed on another end of the main body;
   a fixed piece disposed on the base, and the fixed piece comprising a track;
   a engaging piece slideably protruding from the track, the engaging piece having a first end and a second, the first end of the engaging piece disposed corresponding to the recess of the lid; and
   a driver disposed on the base and connected to the engaging piece for driving the engaging piece to slide in the track along a first direction, wherein the driver comprises:
   a moveable piece having a third end, an extending portion and a fourth end, the extending portion jointing the third and the fourth end and pivotally connected to the base so as to allow the third end and the fourth end of the movable piece to rotate around the extending portion as pivot point, while the third end of the moveable piece connected to the engaging piece for supporting the engaging piece to be engaged with the recess;
   wherein when the engaging piece is driven to slide along the track, the first end of the engaging piece is detached from the recess of the lid.

10. The lift-top optical disc drive according to claim 9, wherein the driver further comprises:
    an electro-magnetic switch disposed on the base and connected to the fourth end of the moveable piece for driving the fourth end of the moveable piece for the moveable piece to rotate;
    wherein the electro-magnetic switch drives the moveable piece to rotate for allowing the engaging piece to slide along the track.

11. The lift-top optical disc drive according to claim 9, wherein the third end of the moveable piece further has a slit, and the engaging piece further has a connecting part formed between the first end of and the second end, the slit holding the connecting part, enabling the engaging piece to slide when the moveable piece rotates.

12. The lift-top optical disc drive according to claim 9, wherein the track is disposed in the main body in a parallel manner, and the engaging piece received in the track is also disposed in the main body in a parallel manner.

13. lift-top optical disc drive according to claim 9, wherein the fixed piece comprises a first side plate, a second side plate and a third side plate disposed corresponding to the bottom, the side surface and the top surface of the engaging piece, the first, second and third side plates are disposed surrounding the engaging piece to form the track.

* * * * *

UNITED STATES PATENT AND TRADEMARK OFFICE
CERTIFICATE OF CORRECTION

PATENT NO. : 7,600,237 B2  
APPLICATION NO. : 11/108682  
DATED : October 6, 2009  
INVENTOR(S) : Chang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Fifth Day of October, 2010

David J. Kappos  
*Director of the United States Patent and Trademark Office*